United States Patent
Kannermark et al.

(10) Patent No.: US 9,635,237 B2
(45) Date of Patent: Apr. 25, 2017

(54) METHOD AND CAMERA FOR DETERMINING AN IMAGE ADJUSTMENT PARAMETER

(75) Inventors: Per Kannermark, Malmo (SE); Andreas Nilsson, Haljarp (SE); Gustav Traff, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 13/543,039

(22) Filed: Jul. 6, 2012

(65) Prior Publication Data

US 2013/0021477 A1    Jan. 24, 2013

Related U.S. Application Data

(60) Provisional application No. 61/509,844, filed on Jul. 20, 2011.

(30) Foreign Application Priority Data

Jul. 19, 2011    (EP) ..................................... 11174491

(51) Int. Cl.
    *H04N 5/232*      (2006.01)
    *G08B 13/196*      (2006.01)

(52) U.S. Cl.
     CPC ..... *H04N 5/23212* (2013.01); *H04N 5/23219* (2013.01)

(58) Field of Classification Search
     CPC .............. H04N 21/44218; H04N 7/188; G06F 17/30793; G06K 9/00771; G08B 13/196; G08B 13/19613
     USPC ....................................................... 348/169
     See application file for complete search history.

(56) References Cited

U.S. PATENT DOCUMENTS

| 5,986,695 | A | * | 11/1999 | Choi ...................... H04N 7/188 348/143 |
| 6,137,580 | A | | 10/2000 | Gelbart |
| 7,148,912 | B2 | * | 12/2006 | Han ................. G08B 13/19604 348/143 |
| 8,055,018 | B2 | | 11/2011 | Han et al. |

(Continued)

FOREIGN PATENT DOCUMENTS

| JP | 2010-021943 A | 1/2010 |
| KR | 2006-0020108 A | 3/2006 |

(Continued)

OTHER PUBLICATIONS

Ihaddadene, Nacim and Djeraba, Chabane "Real-time Crowd Motion Analysis" IEEE, Nov. 2008 (4 pages).

(Continued)

*Primary Examiner* — Obafemi Sosanya
(74) *Attorney, Agent, or Firm* — Volpe and Koenig, P.C.

(57) ABSTRACT

The present invention relates to a method and a camera for determining an image adjustment parameter. The method includes receiving a plurality of images representing an image view, detecting from the plurality of images events of a specific event type, identifying a location within the image view where the event of the specific type is present, determining a presence value of each of the identified locations, and determining an image adjustment parameter based on data from an adjustment location within the image view. The adjustment location is determined based on the presence value in each location of a plurality of locations within the image view.

24 Claims, 3 Drawing Sheets

(56) References Cited

U.S. PATENT DOCUMENTS

| | | |
|---|---|---|
| 2006/0210264 A1 | 9/2006 | Saga |
| 2008/0043112 A1 | 2/2008 | Nikkanen et al. |
| 2008/0187187 A1 | 8/2008 | Tezuka |
| 2008/0199056 A1 | 8/2008 | Tokuse |
| 2009/0091633 A1 | 4/2009 | Tamaru |
| 2010/0007748 A1 | 1/2010 | Suzuki |
| 2010/0007763 A1* | 1/2010 | Yokohata ........... H04N 5/23212 348/222.1 |
| 2010/0110183 A1 | 5/2010 | Bobbitt et al. |
| 2010/0272323 A1* | 10/2010 | Oya et al. .................... 382/107 |
| 2011/0280547 A1* | 11/2011 | Fan ..................... G08B 13/196 386/239 |

FOREIGN PATENT DOCUMENTS

| | | |
|---|---|---|
| TW | I331307 | 10/2010 |
| TW | I335181 | 12/2010 |
| WO | 2008032860 A1 | 3/2008 |

OTHER PUBLICATIONS

Office Action with English Translation received in corresponding Korean Patent Application No. 10-2012-0078871 dated Aug. 10, 2015.

Taiwanese Patent Appln. No. 101124534 Search Report dated Jul. 27, 2016.

\* cited by examiner

METHOD AND CAMERA FOR DETERMINING AN IMAGE ADJUSTMENT PARAMETER

FIELD OF THE INVENTION

The present invention relates to a method for determining an image adjustment parameter. The present invention also relates to a camera and a camera system for capturing a plurality of images representing an image view and for determining an image adjustment parameter.

BACKGROUND OF THE INVENTION

Cameras are commonly used in order to monitor buildings, roads, shops etc. Especially, cameras are used to monitor scenes in order to detect and/or track events in form of presence of motion and/or the presence of an object of a special type, such as a person, a vehicle, a face, a license plate etc.

Depending on the type of events monitored by the camera, the camera settings of the camera and/or the processing of the image data captured by the camera are adjusted in order to best capture the type of events to be monitored. For example, according to US2008/0043112 a long exposure time is used as long as there is no motion in the captured images. When a motion is detected a switch in exposure time to a shorter exposure time occurs.

The above is just one example of a camera setting adjustment in order to best capture the type of events to be monitored. However, there is still a need for additional improvement in how to adjust camera and/or image data processing settings in order to achieve an, for a specific monitoring situation, optimized image quality.

SUMMARY OF THE INVENTION

In view of the above, a method is disclosed which enables improvement in determining image adjustment parameters, such as the settings of the camera and/or the processing of the image data captured by the camera, in order to achieve an optimized image quality, for a specific monitoring situation.

A method is disclosed which determines an image adjustment parameter. A camera arranged for capturing a plurality of images representing an image view and for determining an image adjustment parameter is also disclosed.

A method for determining an image adjustment parameter is provided. The method comprises receiving a plurality of images representing an image view, detecting from the plurality of images events of a specific event type, identifying, for each event of the specific event type, a location within the image view where the event of the specific type is present, determining a presence value of each of the identified locations, a presence value is formed to reflect a number of occurrences of events of the specific event type in one of the identified locations, and determining an image adjustment parameter based on data from an adjustment location within the image view, wherein the adjustment location is determined based on the presence value in each location of a plurality of locations within the image view.

The term "image adjustment parameter" may be understood, in the context of the present application, as a camera setting, as an image processing setting, or as a combination thereof. An image adjustment parameter being a camera setting may be, as non-limiting examples, a parameter related to a change of focus, exposure time, gain, iris, or depth of field of a camera. An image adjustment parameter being an image processing setting may be, as non-limiting examples, a parameter changing color scheme, signal to noise ratio or contrast.

The term "event" may be understood, in the context of the present application, as presence of motion or as presence of an object of a specific type, such as a person, a vehicle, a face, a license plate etc. Accordingly, the interpretation of the term "event" does depend on the situation and the implementation of the invention. The term "event" may reflect a change within the image or it may be the presence of a static object. Typically the data used to represent an event is output data from a motion detection algorithm (motion detector) and/or an object tracking algorithm (object tracker). The motion detection algorithm or the motion detector is normally used to identify an event in the form of presence of motion. The object tracking algorithm or the object tracker is normally used to identify an event having a specific appearance or shape, such as a person, a vehicle, a face, a license plate, etc. The events are normally categorized into a specific type of event, such as presence of motion or presence of an object of a specific type, for instance a person, a vehicle, a face or a license plate, etc.

The term "presence value" may be understood, in the context of the present application, as reflecting the number of occurrences of events, among all events within the plurality of images, being determined to be present at a specific location within the image view.

The term "location" should be understood, in context of the present application, as a location within an image view of a camera being arranged to capture the plurality of images. The location may be represented as a coordinate within an image view, for instance using the pixel coordinate system but other representations may also be used. Depending on the size of each location and the extent of an event within the image view, the event may cover more than one location; hence in one embodiment a determined presence of an event of a specific type may result in a presence in more than one location. The presence value in each of the determined locations may be represented in a 3D histogram or frequency map. Hence, each bin, corresponding to a location in the 3D histogram or frequency map, contains a value indicating how many times an event of the specific type has occurred at that specific location. Alternatively, the presence value may be represented as a mathematical expression, for instance a plane being a polynomial and where the presence value in each location being the value of this polynomial in the specific location. Thus, the presence value in each of the determined locations indicates locations where events of the specific type generally appear and also locations where events of the specific type generally do not appear. This will be further explained by the following example. If the event of the specific type is representing presence of motion and if the camera capturing the image data is monitoring a corner shop the locations showing the highest presence value would typically be the queue to the cashier and/or a certain shelf, where movement of people often is detected.

According to this, a method for determining image adjustment parameters is achieved and especially a method facilitating improvements in image quality where, within the image, the image quality improvement is best needed. For example, by masking out the static parts of a scene monitored by a camera, i.e., the parts where the number of occurrence of events of the specific event type is low, e.g., no motion is present, the interesting parts of the image can be captured and/or processed in a better and more optimized way gaining improved image quality for the most interesting parts of a scene. For example, by determining the presence value in each of the determined locations, it is possible to change the iris setting of the camera capturing the image data so that the camera focuses on the part of the scene having the highest probability for an event of the specific type to occur.

In line with this, locations having a low presence value will be regarded as less relevant whereas locations having a high presence value will be regarded as relevant. When the dynamics in the image require an optimization choice to be made these relevant locations will be the focus for the optimization. This may lead to increased image quality in the locations having the highest presence value.

By optimizing the image quality for the most interesting locations of the scene, not all image data need to be processed in the same way. This may for example save on processor capacity and/or on bandwidth. Moreover, less heat may be produced as the used processor power is less.

The step of determining the presence value of the identified location may comprise providing an existing presence value of each of the identified locations, and aggregating the existing presence value of each of the identified locations and a new presence value reflecting the number of further occurrences of the detected events of the specific event type in the identified location.

The adjustment location may be determined as one or more locations in the image view having a presence value above a threshold. Hence, the processing of image data and or camera setting of the camera capturing future images may be optimized for the locations of the image view being regarded as relevant. One non-limiting implementation of this is to only process the locations of the scene monitored by a camera being regarded as relevant leaving the less relevant parts in raw form. This saves on processing in a system implementing the method.

The location of the event of the specific event type may be represented by a pixel coordinate within the image view. It should however be understood that an event may cover more than one pixel in the image view, or alternatively, more than one location may be determined for each event of the specific type.

The image data may be captured by a camera having pan and/or tilt capabilities. If so the location of the event of the specific event type may be represented by a pixel coordinate within one of the plurality of images together with the current pan/tilt setting of the camera. Since a pan/tilt camera moves, the pan/tilt setting of the camera helps identifying the location in the image view monitored by the camera, where an event occurred. Accordingly, presence values for all the locations in the image view monitored by the pan/tilt camera may be determined.

The method may further comprise adjusting processing of image data by using the image adjustment parameter. The adjustment is normally influencing the processing of future image data to be captured by a camera or of already recorded images. Some examples of image processing parameters that could be adjusted may be parameter changing color scheme, signal to noise ratio, contrast, etc.

The image data may be captured by a camera. If so, the method may further comprise adjusting a camera setting of the camera by using the image adjustment parameter.

According to another embodiment, a camera is arranged for capturing image data corresponding to a plurality of images representing an image view and for determining an image adjustment parameter is presented. The camera includes an event location detector being arranged to detect, from the plurality of images, events of a specific event type as well as a location within the image view where each of the events of the specific type is present. The camera further includes a presence value determinator being arranged to determine a presence value for each of the locations within the image view, where the presence value is formed to reflect a number of occurrences of events of the specific event type in one of the locations within the image view. The camera further includes an adjustment location determinator arranged to determine an adjustment location based on the presence value in each location of a plurality of locations within the image view. An image adjustment parameter determinator is arranged to determine an image adjustment parameter based on data from the adjustment location.

The event location detector, the presence value determinator, the adjustment location determinator and/or the image adjustment parameter determinator may be implemented by means of software code stored in a memory of the camera and being executed by means of a processor in the camera, by means of hardware units being present in the camera, or by means of a combination thereof.

The camera may comprise a refocusing unit, an exposure time setting unit, a gain setting unit, an iris setting unit and/or a depth of field setting unit, wherein the image adjustment parameter is used to adjust the refocusing unit, exposure time setting unit, gain setting unit, iris setting unit and/or depth of filed setting unit of the camera.

The event location detector may be implemented as a motion detector, an object tracker or a combination thereof.

According to yet another aspect of the present invention a computer-readable recording medium is presented. The computer-readable recording medium has recorded thereon a program for implementing the method according to the above described aspect of the invention and embodiments thereof, when executed on a device having processing capabilities.

BRIEF DESCRIPTION OF THE DRAWINGS

This and other aspects of the present invention will now be described in more detail, with reference to appended drawings showing embodiments of the invention. The drawings should not be considered limiting the invention to the specific embodiment. Instead the drawings are used for explaining and understanding the invention.

DETAILED DESCRIPTION

Figure 1:
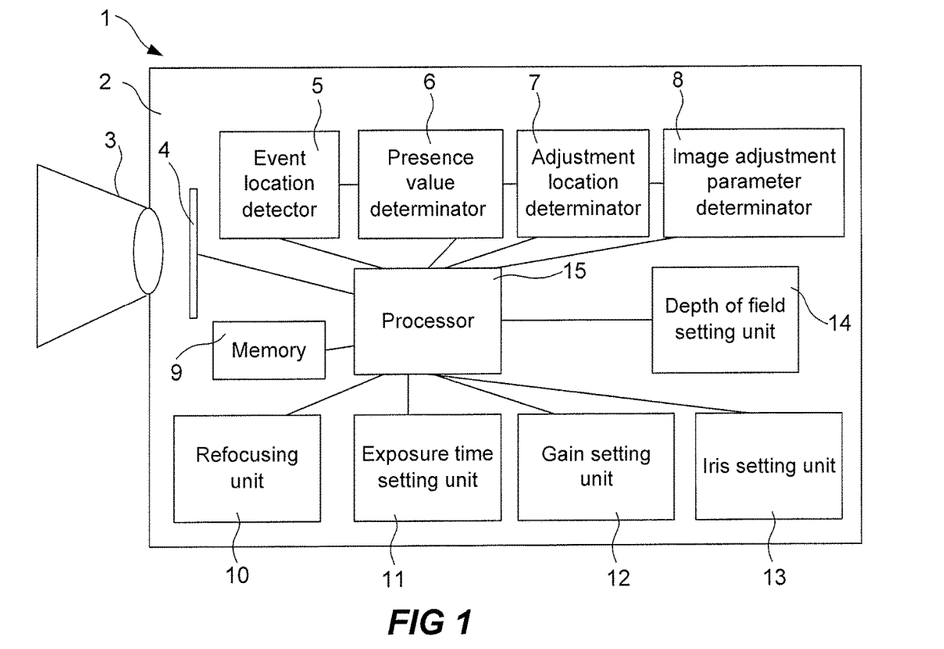
FIG. 1 is a schematic view of a digital network camera according to an embodiment.

FIG. 1 shows a schematic view of a camera 1 according to an embodiment of the present invention. The camera 1 may be a digital network video camera, for example. Further, the camera 1 may be a stationary camera or a camera having pan/tilt functionality. In order to facilitate the understanding of the invention, standard features of a camera not being relevant for the present invention are not described. The camera 1 comprises a housing 2, a lens 3, an image sensor 4, an event location detector 5, a presence value determinator 6, an adjustment location determinator 7 and an image adjustment parameter determinator 8, a memory 9, a refocusing unit 10, an exposure time setting unit 11, a gain setting unit 12, an iris setting unit 13 a depth of filed setting unit 14 and a processor 15.

The processor 15 is arranged to process and/or pass on data being generated by any of the other components of the camera 1.

The lens 3 and the image sensor 4 are arranged to capture images representing an image view and send the images further to the event location detector 5. The image sensor 4 may for example be a Charge Coupled Device (CCD), a CMOS-sensor or similar, for registering incident light. Alternatively, the image sensor 4 may be a sensor registering non visible light, such as a bolometer.

The event location detector 5 in the camera 1 is arranged to receive image data corresponding to a plurality of images captured by the camera 1. The event location detector 5 analyzes the image data corresponding to the plurality of images and determines a presence of an event. In case of an event being present, the event location detector 5 is also arranged to determine a location within the image view for each event. Moreover, the event location detector 5 is arranged to determine the type of event. Types of events are the presence of motion and/or the presence of an object of a specific type, such as a person, a vehicle, a face, a license plate etc.

Figure 2:
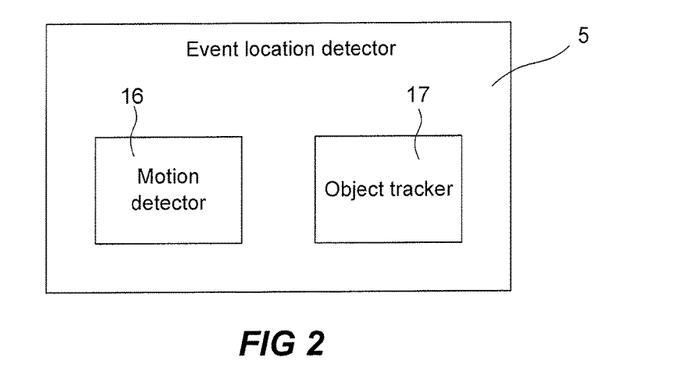
FIG. 2 is a schematic view of an event location detector according to an embodiment.

The event location detector 5 may be implemented as a motion detector 16, as an object tracker 17 or as a combination thereof. An embodiment of the event location detector 5 comprising both a motion detector 16 and an object tracker 17 is illustrated in FIG. 2.

The motion detector 16 is arranged for detecting and analyzing motion in an image view monitored by the camera 1. Presence of motion within the image view may be regarded as an event. Normally, image data corresponding to a plurality of images in the form of a video sequence is analyzed in order to determine the presence of motion. Examples of methods of motion detection include analyzing spatial-temporal changes in an image volume of a video sequence.

The object tracker 17 is arranged to detect a presence of an object of a specific type, such as a person, a vehicle, a face, a license plate, etc. The object tracker 17 may be implemented by using methods for identifying an object based on analyzing visual features in the images captured by the camera 1. Different types of methods for pattern or feature detection may be, for example, used for object detection. When analyzing visual features instead of motion, it does not matter if the object that is to be identified is in motion or stationary. Predefined types of objects having specific appearance that are detected may for example be people, vehicles, faces, license plates etc., i.e. any type of object that may be distinguished from other events using visual features. Combinations of the methods described above and other types of similar methods may also be used to improve the identification or recognition of the presence of events of different event types.

The location of the detected event is a location within the image view of the camera 1. Depending on the size of each location and the extent of an event, the event normally covers more than one location. Hence a determined presence of an event will normally result in occurrence in more than one location.

According to one embodiment, each location within a scene monitored by the camera is represented by a pixel in the camera's image view.

According to another embodiment, each location within a scene monitored by the camera is represented by a location, e.g., a pixel in the camera's current image view (i.e., represented by a pixel coordinate within one of the plurality of images), together with a pan/tilt setting of the camera. This is applicable for a camera having pan/tilt functionality. Accordingly, a location within the image view monitored by the pan/tilt camera may be determined.

The presence value determinator 6 is arranged to receive data from the event location detector 5. The data comprises the locations within the image view of the events and/or information regarding the type of event. Information regarding the event is for example if the event is presence of motion or if the event is a specific object, e.g., a face. The presence value determinator 6 is further arranged to analyze the data in order to determine a presence value for each of the locations within the image view. A presence value is formed to reflect a number of occurrences of events of the specific event type in one of the locations within the image view. Depending on the size of each location and the extent of an event, the event may occur in more than one location. The presence values may be represented in a 3D histogram or a frequency map. Hence, each bin, corresponding to a location in the 3D histogram or the frequency map, contains a value indicating how many times an event of the specific type has occurred at that specific location within the image view. Thus, presence values indicate locations where events of the specific type generally appear and also locations where events of the specific type generally not appear. If, for example, the camera 1 monitors a road and its surrounding environment, the presence value determinator 6 receives data from the event location detector 5, the data comprises locations of the presence of cars. The presence value determinator 6 analyses the data in order to determine the number of occurrences of cars in each of the locations of the image view monitored by the camera 1. As the number of occurrences of cars increases in certain locations of the scene monitored by the camera, the presence value within these locations also increases. A way of visually describing this is by plotting the number of occurrences for each location in a 3D histogram or a frequency map. In the example given using a road and cars, the locations representing the road will most likely have the highest number of occurrences after having a fair number of events analyzed.

Figure 3:
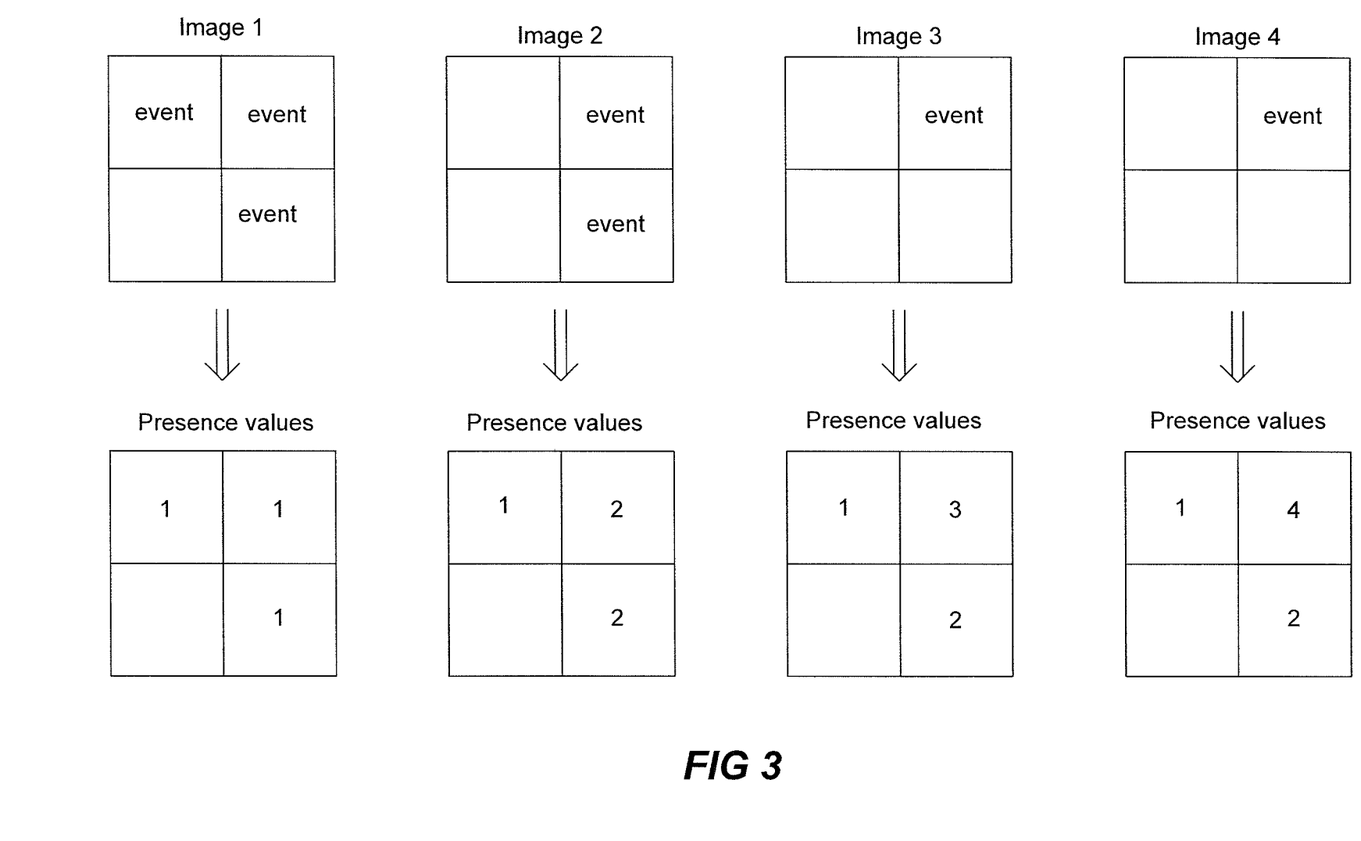
FIG. 3 shows a simplified example of the creation of presence values for different locations of an image view.

FIG. 3 illustrates a simple example of four images representing an image view having each four locations, for instance being four pixels. An event of a specific event type has been found in all four images. The event of the specific type originates from the same specific event in all four images. It is realized, however, that the event of the specific event type may originate from different specific events in the various images. As the four images are analyzed, a corresponding presence value for each of the four locations are aggregated. As mentioned above, the presence values may be represented as a 3D histogram or a frequency map. However, the presence values may also be represented as a mathematical expression, for instance a plane being a polynomial and where the presence value in each location being the value of this polynomial in the specific location.

According to one embodiment, the presence value determinator 6 is arranged to dynamically update the presence value over time as more image data is captured. The updating may be triggered in various ways. According to one example, the updating is triggered when a certain amount of image data has been captured. According to another example, the updating is triggered by a certain time period elapsed since the last update. The update may be, for example, that the presence value determinator 6 is arranged to simply add data regarding events originating from newly captured and analyzed images to the already existing presence values. According to another example, the presence value determinator 6 is arranged to update the presence value by deleting old events. According to a further embodiment, data regarding events originating from newly captured and analyzed images are added to already existing presence values and data corresponding to old events are deleted from the presence values.

The adjustment location determinator 7 is arranged to analyze the presence values for the locations of the image view in order to determine an adjustment location. The adjustment location is determined as one or more locations in the image view having a presence value above a threshold. Locations having a low occurrence of events, being below the threshold, will be regarded as less relevant whereas locations having a high occurrence of events, being above the threshold, will be regarded as relevant.

The image adjustment parameter determinator 8 is arranged to determine an image adjustment parameter based on data from the adjustment location. Based on the received data, the image adjustment parameter determinator 8 determines if an action is to be taken in terms of changing an image adjustment parameter. Again, using the example with the road and cars above, the image adjustment parameter determinator 8 may find that the road is the most relevant area to monitor and will determine one or more image adjustment parameters to be used to optimize the monitoring of the road.

The image adjustment parameter determinator 8 is arranged to change a setting of the camera itself, to change a parameter used in the processing of the image data captured by the camera, or a combination thereof. A change in a setting of the camera may be, for example, a change in the refocusing unit 10, an exposure time setting unit 11, the gain setting unit 12, the iris setting unit 13 and/or the depth of field setting unit 14. This change will affect the images that are to be captured. A change in a parameter used in the processing of the image data captured by the camera may be, for example, a change in a parameter controlling a color scheme, a signal to noise ratio or a contrast.

Using the information on less relevant and relevant locations determined by the adjustment location determinator 7, the image adjustment parameter determinator 8 is arranged to determine an image adjustment parameter being optimized for the relevant locations. By doing so, the image adjustment parameter may be used to optimize the camera settings or the processing of image data for the locations of the image view monitored by a camera being regarded as relevant, i.e. where, based in history, the probability for an event to be present is highest. Accordingly, it will be possible to optimize the display of the scene for the locations where it is most probable that an event is being present in the future.

It is realized that the event location detector 5, the presence value determinator 6, the adjustment location determinator 7 and/or the image adjustment parameter determinator 8 may be implemented using hardware or software. If implemented in software, the software may be recorded on a computer-readable recording medium, e.g., the memory 9 of the camera 1, in order to be executed by the processor 15 of the camera 1.

Figure 4:
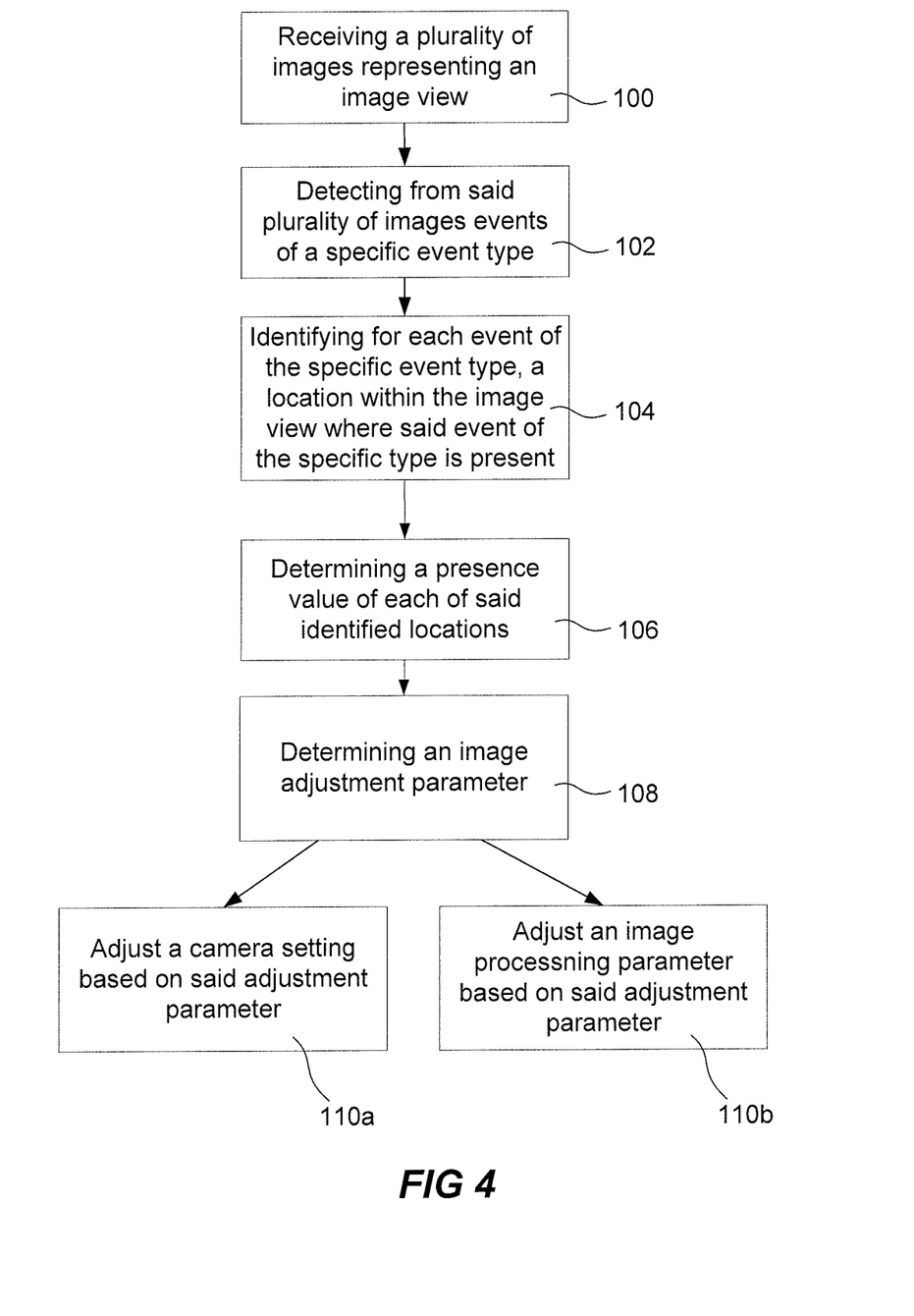
FIG. 4 is a schematic flow chart, showing a method according to an embodiment.

FIG. 4 illustrates a schematic flow chart according to an embodiment of a method for determining an image adjustment parameter. The method comprises the following steps: receiving 100 a plurality of images representing an image view; detecting 102 from the plurality of images events of a specific event type; identifying 104, for each event of the specific event type, a location within the image view where the event of the specific type is present; determining 106 a presence value of each of the identified locations, where each presence value is formed to reflect a number of occurrences of events of the specific event type in one of the identified locations; and determining 108 an image adjustment parameter based on data from an adjustment location within the image view, wherein the adjustment location is determined based on the presence value in each location of a plurality of locations within the image view.

During step 102, the received images are analyzed and events of a specific type are detected. An event may either be represented as a presence of motion or as an object having a specific appearance such as a person, a vehicle, a face, a license plate, etc. Presence of motion is typically identified via a motion detection algorithm whereas presence of an object having a specific appearance is typically identified via an object tracking algorithm.

By, step 104, identifying for each event of the specific event type, a location within the image view where the event of the specific type is present locations within an image view monitored by a camera being arranged to capture the plurality of images is determined. Depending on the size of each location and the extent of an event, the event may cover more than one location. Hence, a determined presence of an event will normally result in a presence value in more than one location. The location of each identified event may be determined as the coordinates of the pixels in the image/images containing the event. This is a typically situation when the plurality of images are captured by a stationary camera. For a situation when the plurality of images are captured by a camera having pan/tilt functionality the location of each event is typically described as a location within the coordinate system of the image containing the event combined with the pan/tilt setting of the camera. In this manner the location within the image view covered by the pan/tilt camera may be deduced.

During step 106, information from steps 102 and 104 is analyzed and a presence value in each of the locations of the image view is determined. Thus, the presence values indicate locations where events of the specific type generally appear and also locations where events of the specific type generally not appear.

According to one embodiment, the step 106 of determining the presence value of each of the identified locations comprises aggregating the number of occurrences of events of the specific event type in each of the identified locations.

During step 108, the image adjustment parameter is determined based on data from an adjustment location within the image view. The image adjustment parameter may be used to adjust 110*a* a camera setting on a camera used to capture the plurality of images, to adjust 110*b* a parameter used in the processing of the image data, or a combination thereof. An adjustment in a camera setting may be, for example, an adjustment affecting the focusing, exposure time, gain, iris, depth of field, etc of the camera. This adjustment may affect the images that are to be captured. An adjustment in a parameter used in the processing of the image data captured by the camera may for example be an adjustment in a parameter controlling the color scheme, the signal to noise ratio, the contract etc. This adjustment may affect new images to be processed. Depending on the format of already processed images, the image adjustment parameter may even be used to reprocess images that are already processed.

As an additional step, the presence value is updated when further events of that specific type have been identified. The updating may be made in various ways. According to one embodiment, the updating is made on a timely basis. That is, first a further plurality of images is collected during a predetermined time period, and secondly it is checked whether or not each of the further plurality of images contains an event of the specific type, and thirdly if so a location of the event of the specific type is determined. Next, the presence values of the locations in the image view are updated with this newly gathered information regarding further events. Thereafter, the image adjustment parameter is updated based on the updated presence values. Alternatively the updating is made "on the fly", i.e., the images are analyzed and the presence values are updated as the images are being captured.

According to one embodiment, the step of determining the presence value of the identified location comprises providing an existing presence value of each of the identified locations, and aggregating the existing presence value of each of the identified locations and a new presence value reflecting the number of further occurrences of the detected events of the specific event type in the identified location. This is an example of how to update already present presence values.

The person skilled in the art realizes that the present invention by no means is limited to the embodiments described above.

For example the invention is applicable both for digital and analogue cameras. In today's intelligent analogue cameras digital image processing is carried out within the camera and the digital signal is then converted to an analogue signal before leaving the camera. Also using an image A/D converter connected to an analogue camera, a simpler analogue camera may be used.

Further, the camera 1 may be connected to a network, be a standalone camera or be connected within a system in other ways.

Moreover, the plurality of images may be either still or moving images or a combination thereof.

Yet further, the invention does not need to be implemented in a camera, it may instead be implemented in a camera system comprising a camera and a processing unit. Thus, the camera is connected to the processing unit, e.g., via a network. According to this embodiment, the camera is arranged to capture a plurality of images making up the image data and the processing unit is arranged to process the image data. Hence, the processing unit comprises the event location detector 5, the presence value determinator 6, the adjustment location determinator 7 and the image adjustment parameter determiniator 8. The processing unit may be arranged to send an image adjustment parameter in the form of a modified camera setting back to the camera or it may determine an image adjustment parameter being an image processing setting used within the processing unit or elsewhere. A plurality of cameras may be connected to the processing unit, wherein the processing unit is arranged to process the images captured by each one of the plurality of cameras.

Thus, many modifications and variations are possible within the scope of the appended claims.

The invention claimed is:

1. A method for adjusting an image adjustment parameter of a camera based on specific areas within an image view of the camera, the method comprising:
receiving a plurality of images in the form of a video sequence representing an image view monitored by the camera;
detecting, from the plurality of images, one or more events, wherein each detected event is of a specific event type, the events of a specific event type being one of presence of motion, presence of an object having a specific appearance, or a combination thereof;
dynamically identifying, based upon the detection of each event, one or more specific locations represented by at least one pixel coordinate within the image view where the detected event is present;
determining a presence value for each of the dynamically identified specific locations within the image view where the detected event is present, wherein each presence value is dynamically updated to reflect a number of occurrences in the plurality of images of the specific event type in each of the dynamically identified specific locations; and
adjusting the image adjustment parameter of the camera, including a camera setting, or an image processing setting, or a combination thereof, for one or more of the dynamically identified specific locations within the image view having a presence value above a threshold.

2. The method according to claim 1, wherein the step of determining the presence value of the identified location comprises:
providing an existing presence value of each of the dynamically identified specific locations, and aggregating the existing presence value of each of the dynamically identified specific locations and a new presence value reflecting the number of further occurrences of the detected events of the specific event type in the dynamically identified specific location.

3. The method according to claim 1, further comprising adjusting processing of image data by using the image adjustment parameter.

4. The method according to claim 1, wherein the image data is captured by a camera and wherein the method further comprises adjusting a camera setting of the camera using the image adjustment parameter.

5. A camera arranged for capturing a plurality of images in the form of a video sequence representing an image view monitored by the camera, and adjusting an image adjustment parameter based on specific areas within an image view of the camera, the camera comprising:
an event location detector arranged to detect, from the plurality of images, one or more events where each detected event is of a specific event type, the events of specific event type being one of presence of motion, presence of an object having a specific appearance, or a combination thereof, wherein the event location detector is further arranged to dynamically detect, based upon the detection of each event, one or more specific locations represented by at least one pixel coordinate within the image view where the detected event is present;
a presence value determinator arranged to determine a presence value for each of the dynamically identified specific locations within the image view where the detected event is present, wherein each presence value is dynamically updated to reflect a number of occurrences in the plurality of images of the specific event type in each of the dynamically detected specific locations;
an adjustment location determinator arranged to determine the one or more of the dynamically detected specific locations within the image view having a presence value above a threshold; and an image adjustment parameter determinator being arranged to receive data from the adjustment location determinator and determine the image adjustment parameter; and a processor arranged to adjust the image adjustment parameter of the camera using the determined image adjustment parameter, the image adjustment parameter including a camera setting, or an image processing setting, or a combination thereof for the one or more of the dynamically detected specific locations within the image having a presence value above the threshold.

6. The camera according to claim 5, wherein the event location detector, the presence value determinator, the adjustment location determinator and/or the image adjustment parameter determinator are implemented by: a software code stored in a memory of the camera and being executed by the processor in the camera; hardware units being present in the camera; or a combination thereof.

7. The camera according to claim 5, further comprising a refocusing unit, an exposure time setting unit, a gain setting unit, an iris setting unit and/or a depth of field setting unit, wherein the image adjustment parameter is used to adjust the refocusing unit, exposure time setting unit, gain setting unit, iris setting unit and/or depth of filed setting unit of the camera.

8. The camera according to claim 5, wherein the event location detector is implemented as a motion detector, an object tracker or a combination thereof.

9. A computer-readable recording medium having recorded thereon a program, which when executed on a device having processing capabilities, performs the method according to claim 1.

10. A method for adjusting an image adjustment parameter of a camera based on specific areas within an image view of the camera, the method comprising:
    receiving a plurality of images representing an image view;
    detecting, from said plurality of images, one or more events, wherein each detected event is of a specific event type, the events of a specific event type being presence of motion and/or presence of an object having a specific appearance;
    dynamically identifying, based upon the detection of each event, one or more specific locations represented by at least one pixel coordinate within the image view where the detected event is present;
    determining a presence value for each of the dynamically identified specific locations within the image view where the detected event is present, wherein each presence value is dynamically updated to reflect a number of occurrences in the plurality of images of the specific event type in each one of the dynamically identified specific location;
    determining the image adjustment parameter for the camera; and
    adjusting the image adjustment parameter of the camera, including a camera setting, or an image processing setting, or a combination thereof, for one or more of the dynamically identified specific locations in the image view having a presence value above a threshold.

11. The method according to claim 10, wherein the step of determining the presence value of said identified location comprises:
    providing an existing presence value of each of the dynamically identified specific locations, and aggregating the existing presence value of each of the dynamically identified specific locations and a new presence value reflecting the number of further occurrences of the detected events of the specific event type in the dynamically identified specific location.

12. The method according to claim 10, wherein said image data is captured by a camera having pan and/or tilt capabilities and wherein said location of said event of the specific event type is represented by a pixel coordinate within one of said plurality of images together with the current pan/tilt setting of said camera.

13. The method according to claim 10, further comprising adjusting processing of image data by using said image adjustment parameter.

14. The method according to claim 10, wherein said image data is captured by a camera and wherein the method further comprises adjusting a camera setting of said camera using said image adjustment parameter.

15. A camera arranged for capturing a plurality of images representing an image view and adjusting an image adjustment parameter based on specific areas within an image view of the camera, the camera comprising:
    an event location detector being arranged to detect, from said plurality of images, one or more events where each detected event is of a specific event type, the events of specific event type being presence of motion and/or presence of an object having a specific appearance, wherein the event location detector further being arranged to dynamically detect, based upon the detected of each event, one or more one or more specific locations represented by at least one pixel coordinate within the image view where the detected events is present;
    a presence value determinator being arranged to determine a presence value for each of the dynamically identified specific locations within the image view where the detected event is present, wherein each presence value is dynamically updated to reflect the number of occurrences in the plurality of images of the specific event type in each one of the dynamically identified specific locations within the image view;
    an adjustment location determinator being arranged to determine one or more of the dynamically detected specific locations within the image view having a presence value above a threshold to be used when determining an image adjustment parameter;
    an image adjustment parameter determinator being arranged to receive data from the adjustment location determinator and determine the image adjustment parameter; and
    a processor arranged to adjust the image adjustment parameter of the camera using the determined image adjustment parameter, the image adjustment parameter including a camera setting, or an image processing setting, or a combination thereof for the one or more of the dynamically detected specific locations within the image having a presence value above the threshold.

16. The camera according to claim 15, wherein said event location detector, said presence value determinator, said adjustment location determinator and/or said image adjustment parameter determinator are implemented by means of software code stored in a memory of the camera and being executed by means of the processor in the camera, by means of hardware units being present in the camera, or by means of a combination thereof.

17. The camera according to claim 15, further comprising a refocusing unit, an exposure time setting unit, a gain setting unit, an iris setting unit and/or a depth of field setting unit, wherein said image adjustment parameter is used to adjust said refocusing unit, exposure time setting unit, gam setting unit, iris setting unit and/or depth of filed setting unit of said camera.

18. The camera according to claim 15, wherein said event location detector is implemented as a motion detector, an object tracker or a combination thereof.

19. A computer-readable recording medium having recorded thereon a program which when executed on a device having processing capabilities, performs the method according to claim 1.

20. A method for adjusting an image adjustment parameter of a camera based on specific areas within an image view of the camera, the method comprising:
receiving a plurality of images in the form of a video sequence representing an image view monitored by the camera;
detecting one or more events in the plurality of images, wherein each detected event is of a specific event type, the events of a specific event type being one of presence of motion, presence of an object having a specific appearance, or a combination thereof;
dynamically identifying for each detected event one or more specific locations within the image view where the detected event type is present, wherein the one or more specific locations are represented by at least one pixel coordinate;
determining a presence value for each of the dynamically identified specific locations within the image view where the detected event is present, wherein each presence value is dynamically updated to reflect a number of occurrences in the plurality of images of a specific event type in each of the dynamically identified specific locations; and
adjusting the image adjustment parameter of the camera, including a camera setting, or an image processing setting, or a combination thereof, for one or more of the dynamically identified specific locations within the image view having a presence value above a threshold.

21. The method according to claim 20, wherein, in case of a stationary camera, a location in the image view is represented by a pixel coordinate in the image or images containing the event, and, in case of a camera having pan and/or tilt capabilities, a location within the image view is presented by a pixel coordinate within one of the plurality of images together with the pan/tilt setting of the camera.

22. The method according to claim 1, wherein a plurality of bins are used to contain the plurality of presence values, each bin corresponding to a location in a 3D histogram or frequency map for indicating how many occurrences the specific event type has occurred at the dynamically identified specific location based upon the detection of each event, wherein locations in the 3D histogram or frequency map are defined by the detected specific event types.

23. The method according to claim 1, wherein the presence value is represented by a mathematical expression associated with the number of occurrences in the plurality of images of each specific event type in each of the dynamically identified specific locations.

24. The method according to claim 23, wherein the mathematical expression is a polynomial where a coefficient for each variable corresponds to a presence value at each identified location.

* * * * *

UNITED STATES PATENT AND TRADEMARK OFFICE
CERTIFICATE OF CORRECTION

PATENT NO. : 9,635,237 B2
APPLICATION NO. : 13/543039
DATED : April 25, 2017
INVENTOR(S) : Kannermark et al.

Page 1 of 1

It is certified that error appears in the above-identified patent and that said Letters Patent is hereby corrected as shown below:

In the Claims

In Claim 7, at Column 11, Line 24, after the word "of", delete "filed" and insert therefor --field--.

In Claim 17, at Column 13, Line 2, after the word "of", delete "filed" and insert therefor --field--.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*